(12) United States Patent
Lem et al.

(10) Patent No.: US 9,873,396 B2
(45) Date of Patent: Jan. 23, 2018

(54) METHOD AND APPARATUS FOR VEHICLE OCCUPANT LOCATION DETECTION

(71) Applicant: FORD GLOBAL TECHNOLOGIES, LLC, Dearborn, MI (US)

(72) Inventors: Jeroen Lem, Maastricht (NL); Pietro Buttolo, Dearborn Heights, MI (US); James Stewart Rankin, II, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/184,243

(22) Filed: Jun. 16, 2016

(65) Prior Publication Data

US 2017/0361792 A1 Dec. 21, 2017

(51) Int. Cl.

| | |
|---|---|
| *B60R 16/037* | (2006.01) |
| *E05B 77/26* | (2014.01) |
| *E05B 81/56* | (2014.01) |
| *E05B 81/74* | (2014.01) |
| *B60N 2/00* | (2006.01) |
| *H04W 4/00* | (2009.01) |
| *H04W 84/04* | (2009.01) |

(52) U.S. Cl.
CPC ............ *B60R 16/037* (2013.01); *B60N 2/002* (2013.01); *E05B 77/26* (2013.01); *E05B 81/56* (2013.01); *E05B 81/74* (2013.01); *H04W 4/008* (2013.01); *H04W 84/042* (2013.01)

(58) Field of Classification Search
CPC ....... B60R 16/037; B60N 2/002; E05B 77/26; E05B 81/56; E05B 81/74
USPC .......................................................... 701/49
See application file for complete search history.

(56) References Cited

U.S. PATENT DOCUMENTS

| | | | | |
|---|---|---|---|---|
| 8,044,782 | B2 * | 10/2011 | Saban .................... | B60N 2/002 |
| | | | | 340/438 |
| 8,527,146 | B1 * | 9/2013 | Jackson ............ | B60W 50/0098 |
| | | | | 180/273 |
| 2014/0297133 | A1 | 10/2014 | Oikawa | |
| 2014/0309866 | A1 * | 10/2014 | Ricci ........................ | B60Q 1/00 |
| | | | | 701/36 |
| 2015/0045988 | A1 * | 2/2015 | Gusikhin .............. | B60R 16/037 |
| | | | | 701/2 |
| 2015/0077327 | A1 | 3/2015 | Pisz et al. | |
| 2015/0232065 | A1 | 8/2015 | Ricci et al. | |

* cited by examiner

*Primary Examiner* — Yazan Soofi
(74) *Attorney, Agent, or Firm* — Jennifer Stec; Brooks Kushman P.C.

(57) ABSTRACT

A system includes a processor configured to determine the location of a wirelessly-identified device within a vehicle. The processor is also configured to determine a locking schema associated with the device for locking child-lockable vehicle systems and apply the locking schema to corresponding systems in a defined proximity to the determined device location.

20 Claims, 9 Drawing Sheets

METHOD AND APPARATUS FOR VEHICLE OCCUPANT LOCATION DETECTION

TECHNICAL FIELD

The illustrative embodiments generally relate to a method and apparatus for vehicle occupant location detection.

BACKGROUND

Determining the presence, permanence, and location of passengers and drivers, inside and outside a vehicle may be useful for many purposes. Current occupant detection and location systems utilize cameras, seat sensors, and key-fob or mobile device detection. While suitable for many applications, each of these systems has some drawbacks.

Camera systems can be expensive due to requisite computational power and optics requirements that allow a vision system camera to distinguish one face from another. Additionally, the user being recognized must be in view of the camera, and cannot have any obstruction (scarf, coat collar, hat etc) blocking a recognizable portion of his face. Further, ambient conditions such as glare from excessive sunlight, shadows, or a dark environment can cause difficulty in recognizing faces.

Seat sensors have been presented as another occupant detection option. These sensors can detect weight in a seat, but cannot necessarily distinguish between objects and an occupant. Further, since multiple people may have similar weights, the sensor may have difficulty assigning an identity to a detected occupant.

Key fob detection may be used to identify a driver and any other occupant carrying a fob. A problem with this solution is that another party (spouse, child) could be carrying the fob, and the system may have no way of discerning which party is carrying the fob. Similarly, mobile phone detection may work reasonably well since one person typically carries her own phone, and only her own phone. However, shared phones and phones left lying in vehicles can cause present challenges. For example a party may be misidentified when possessing another party's phone, or a phone left in the vehicle may be identified as a non-present party.

If a vehicle can accurately identify and locate the individual occupants, the vehicle can leverage a variety of useful related services based on the identified occupants and associated locations.

SUMMARY

In a first illustrative embodiment, a system includes a processor configured to determine the location of a wirelessly-identified device within a vehicle. The processor is also configured to determine a locking-schema associated with the device for locking child-lockable vehicle systems and apply the locking-schema to corresponding systems in a defined proximity to the determined device location.

In a second illustrative embodiment, a computer-implemented method includes setting states of child-lockable vehicle systems based on predefined state-settings associated with an identified wireless device for which a device-location within a vehicle has been identified, wherein the child-lockable vehicle systems are within a predefined proximity to the device-location.

In a third illustrative embodiment, a computer-implemented method includes retrieving a locking schema, defining child-lockable system state-settings, the schema associated with a wireless device within a vehicle at a determined location within the vehicle. The method also includes applying the locking schema to child-lockable systems within the vehicle in a predefined proximity to the determined location, such that the child-lockable systems are set to states defined by the locking schema.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
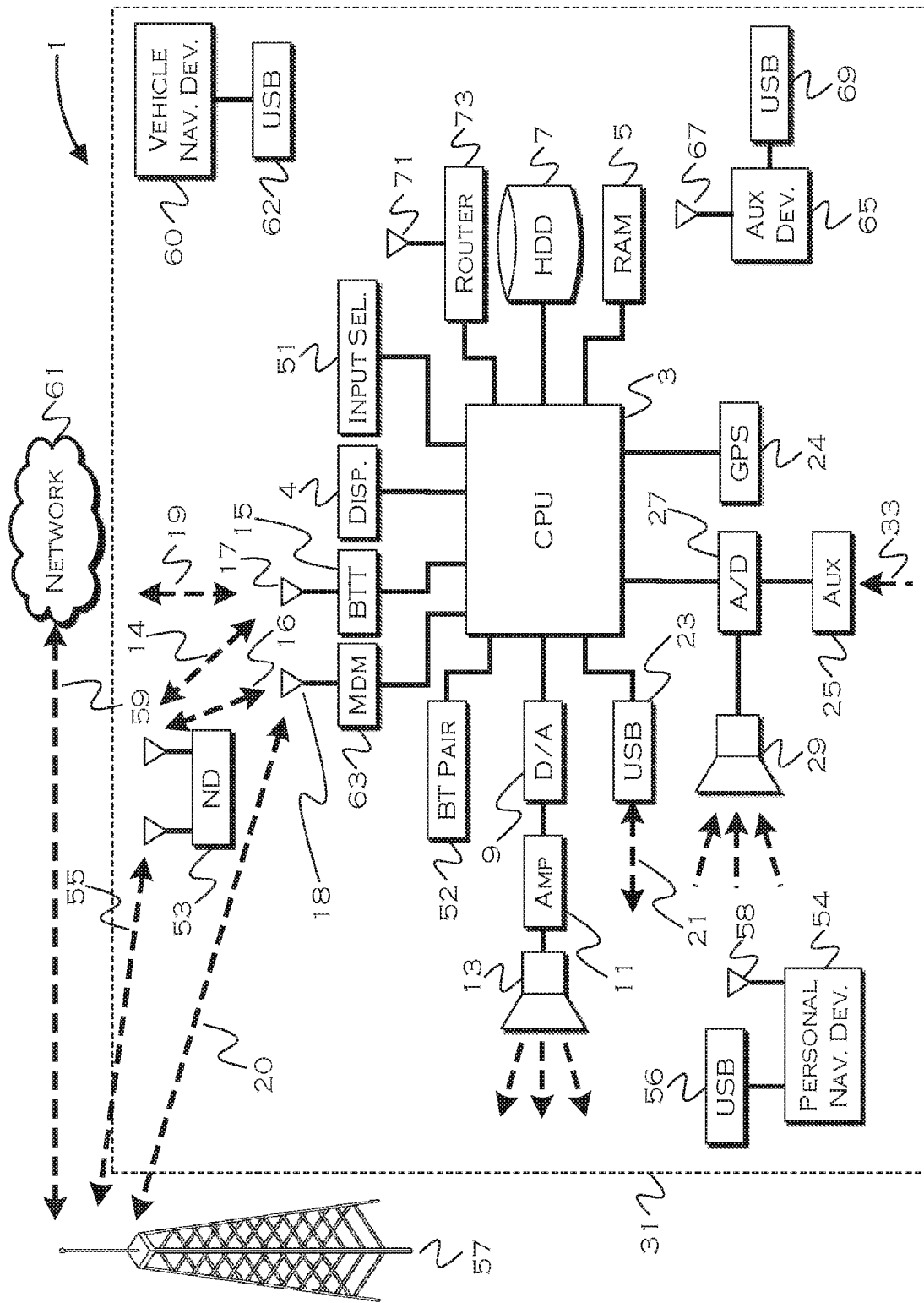
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission, the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73. The CPU can additionally connect to locally based transceivers, such as those described with respect to the illustrative embodiments herein.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments utilize wireless BLUETOOTH low energy (BLE) or other wireless signals to recognize user wearables and to triangulate user positions within a vehicle. Because a wearable (such as a watch) is typically worn by the owner, and because such a device is not commonly left lying in the vehicle, tracking the location of a watch or other similar device and assigning a predicted possessor (typically an owner) may result in a much higher recognition rate. And, if the device has biometric feedback included, the device itself may be able to distinguish between multiple wearers, providing even further assurance that a possessor prediction is accurate.

The illustrative embodiments use modules which include interior components that have included wireless detection and communication capability. Capable of both recognizing wireless device signals and relaying those signals to a central repository, these modules are plug-and-play in nature, so that existing vehicles can be easily retrofit for occupant location detection. Through the use of multiple modules, user location can be triangulated based on signal strength detection, and thus the location of wearables (and presumably the owners) within a vehicle can be determined by the modules in conjunction with a central system.

Figure 2:
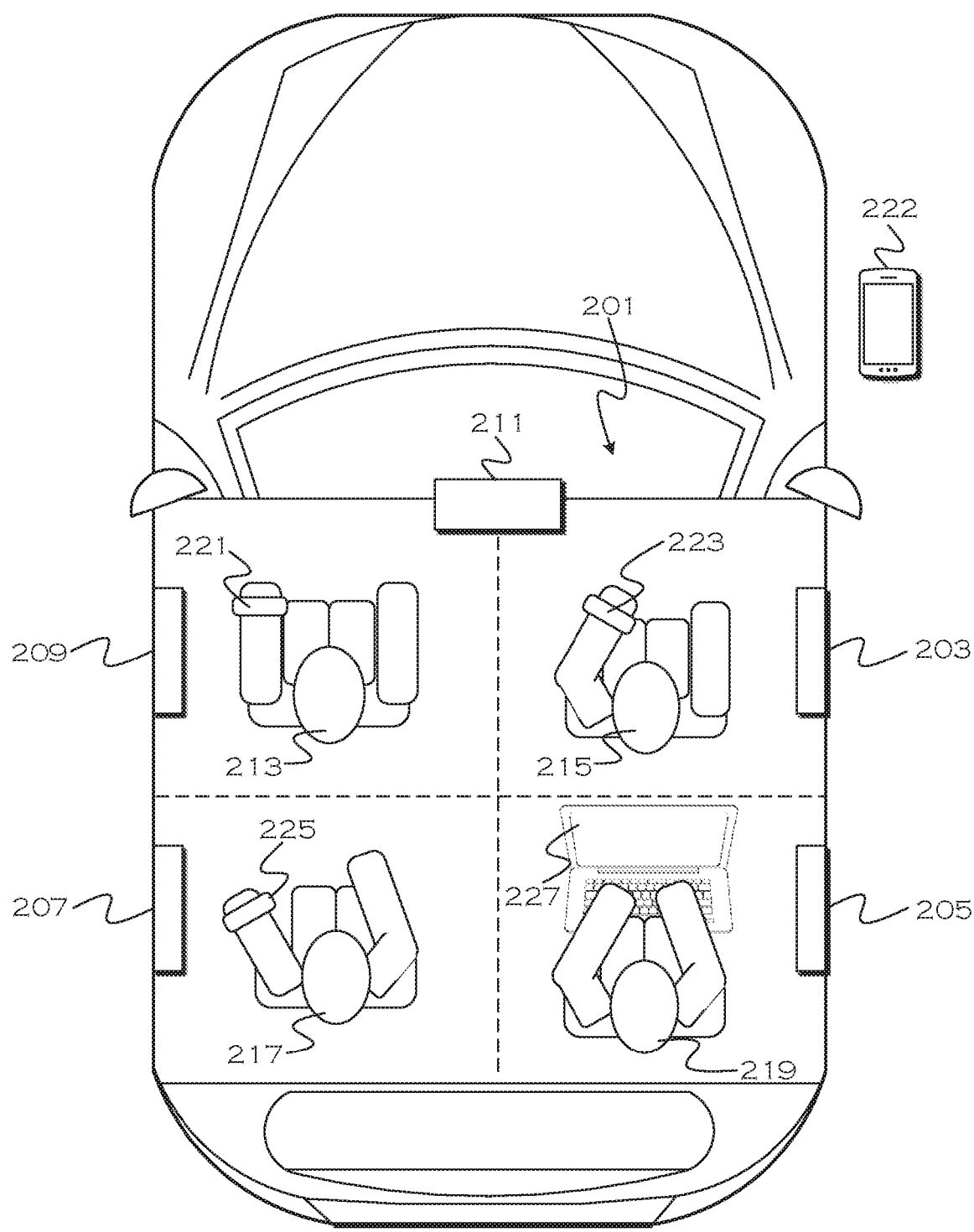
FIG. 2 shows an illustrative vehicle environment.

FIG. 2 shows an illustrative vehicle environment. In this example, four occupants 213, 215, 217, 219 are present in a vehicle 201. The vehicle cabin is equipped with modules included with the dome lights 203, 205, 207, 209, and this or similar placement of modules provides a line-of-sight (useful to prevent signal attenuation) to most positions in the vehicle, as well as from each module to the central receiver 211.

In this example, the driver 213 is wearing a smart watch 221, as is the front passenger 215 (watch 223) and the driver's side rear passenger 217 (watch 225). The passenger 219 is holding a tablet or computer 227, which can also be detectable.

Wearables typically broadcast a presence signal, so each wearable 221, 223, 225 may be periodically or continually broadcasting a presence announcement over BLE or other wireless medium. On the other hand, devices such as the tablet or computer 227 may require explicit instructions to broadcast a signal or may require running an application to be recognized. Unless the tablet automatically identifies itself to local wireless receivers, it may be easier to identify a person through a wearable than through another possessed wireless device.

Also, it is far less likely that any passenger will remove a watch and pass it to another occupant. However, the tablet or computer 227 is more likely to be passed from passenger to passenger, or stored in a center console, under a seat, etc. Thus, it may be difficult to determine both who is in possession of the tablet and where that person is within the vehicle. While this logic demonstrates that wearable device users may be easier to identify than tablet users, it is not intended to suggest that the illustrative embodiments cannot be practiced using non-wearable wireless signal providing devices.

Each device that identifies itself can send a signal detectable by the modules 203, 205, 207 and 209. Module 209 will likely receive a stronger signal from watch 221 than will module 203, for example. A signal of medium strength (with respect to the other signals) will be received by module 207. Module 205 will likely receive a weak or the weakest signal. This information (the received signal strength indication, known as RSSI) can be used to determine that the possessor of watch 221 is located most proximate to module 209 (the driver's seat). Similar determinations can be made for the location of the other devices in the cabin, based on the received signal strength corresponding to each device at each module (or each module that receives a signal).

Figure 3A:
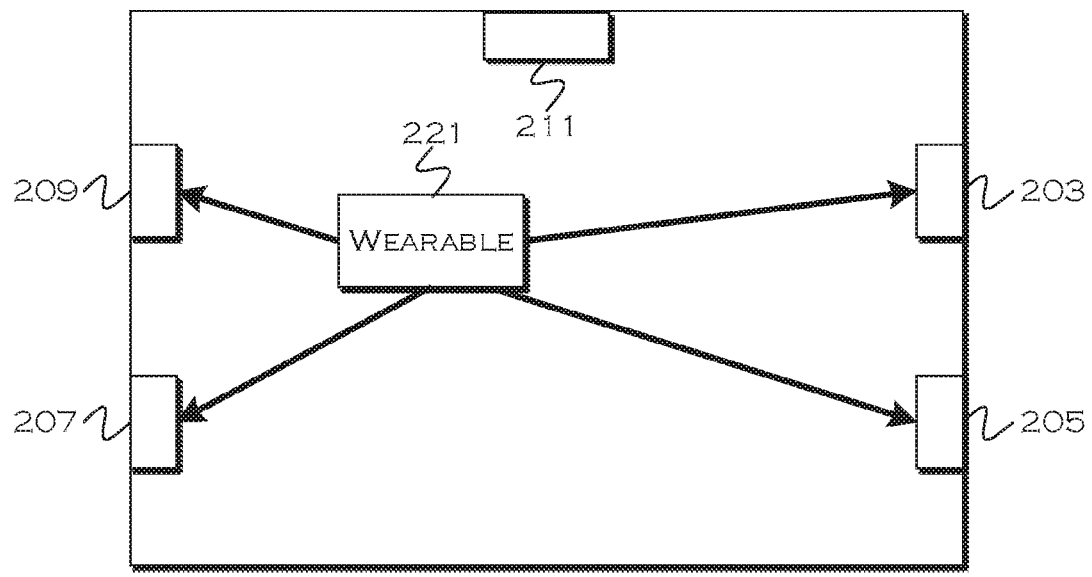
FIGS. 3A and 3B show illustrative identification transmission.
Figure 3B:
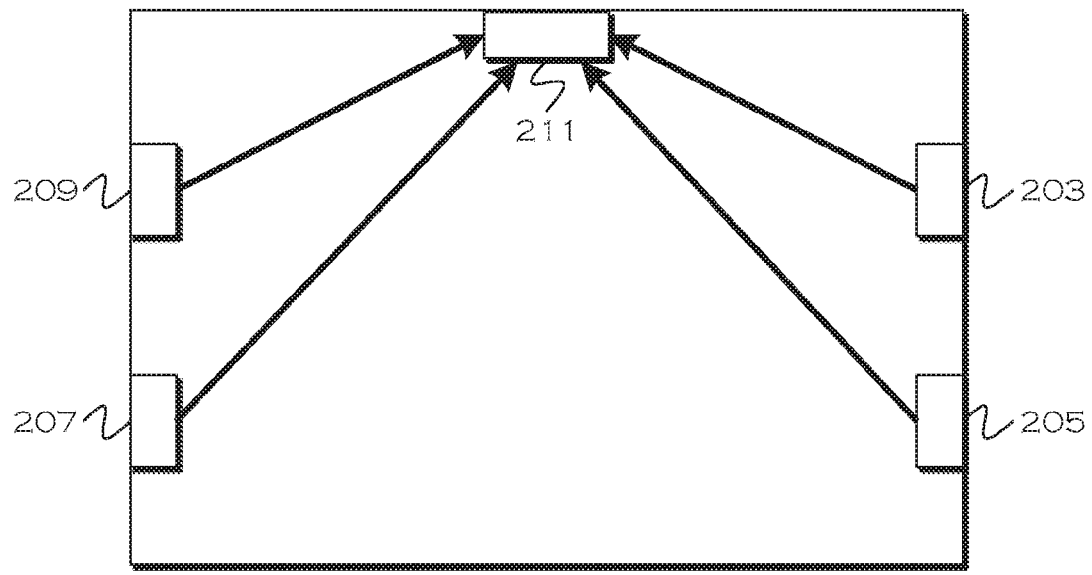

FIGS. 3A and 3B show illustrative identification transmission. In these examples, the modules act as relays, receiving signals from devices located inside the cabin (or otherwise in communicable proximity to the module) and sending those signals, along with an RSSI for each signal at each device. The device may also have a unique identifier included in the signal it broadcasts, so that distinction between signals can be made on a device-by-device basis.

In FIG. 3A, the modules 203, 205, 207 and 209 each receive a signal from the device 221 worn by the driver. In FIG. 3B, each module relays the signal to a centralized processing unit 211. This unit can track occupant location, keep track of occupant profiles, track common occupants (e.g., frequent users) and can upload any or all of this information to the cloud.

When an occupant location and identification are known, any adjustments or preferences exhibited by that occupant can also be known and associated with the occupant identity. For example, a person in a rear passenger seat who watches action movies in one vehicle (i.e., the particular person actively selects the media) can have an action movie preference stored with respect to his profile, for media suggestion in another vehicle. In a similar manner, seat adjustments, HVAC adjustments, and any other detectable vehicle configurations or preferences can be tracked on a per-occupant basis, associated with a profile, uploaded to the cloud and retrieved if that user is ever in another similarly equipped vehicle. This allows for transition of preferences from vehicle to vehicle, regardless of where the particular user is located within a particular vehicle (assuming a corresponding adjustment can be made at the present location).

Figure 4:
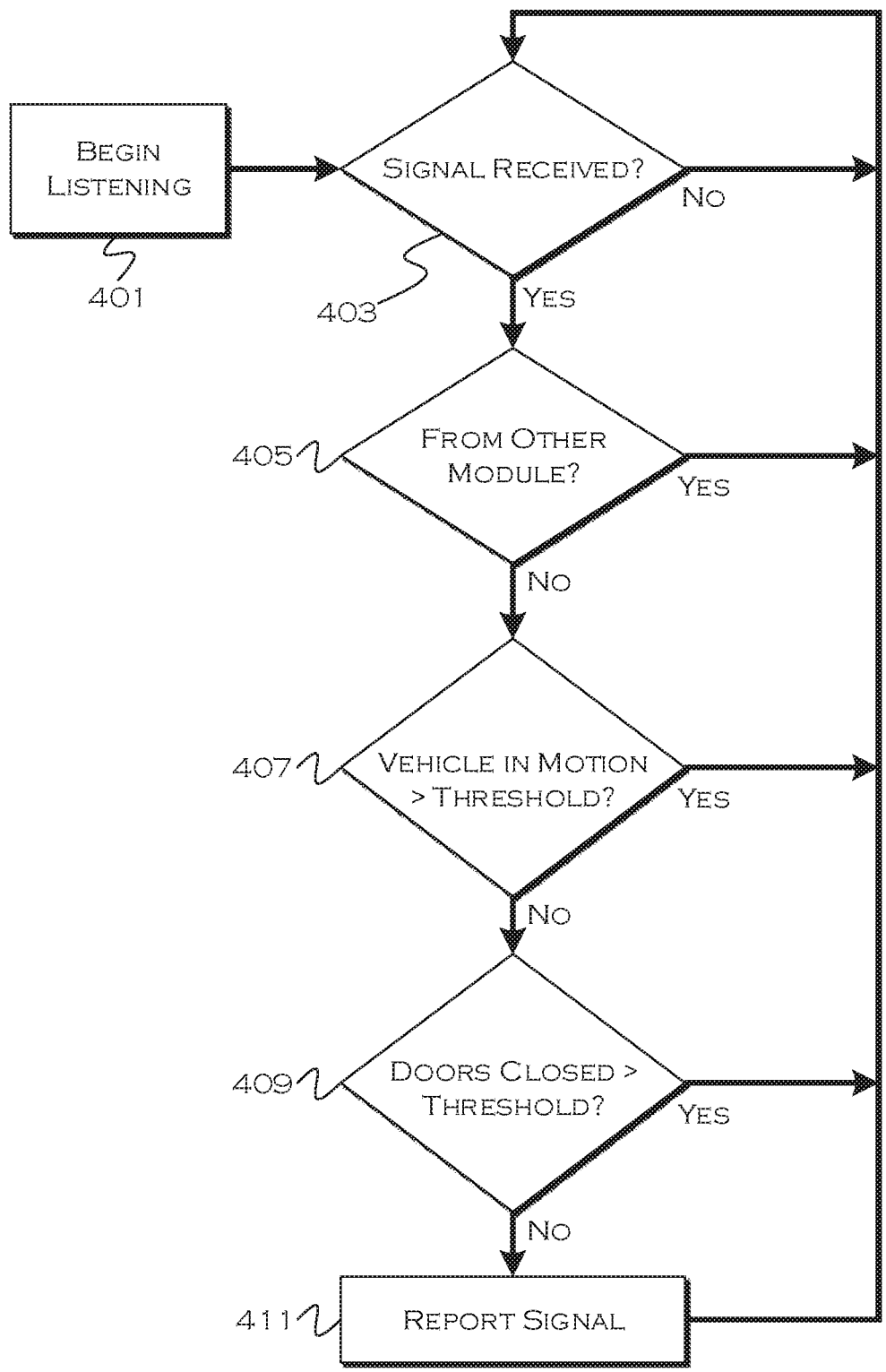
FIG. 4 shows an illustrative process for device detection and reporting.

FIG. 4 shows an illustrative process for device detection and reporting. In this example, after the vehicle is started (or in a background application running on low power), the process begins to listen for device signals 401. Since most wearables announce their location via BLE or other wireless signals, each module can determine if any detectable BLE or other wireless signals are present 403.

If a signal is received, a small amount of vetting, in this example, occurs at the module. First, the process determines if the signal is from another module 405 (as opposed to from a device). Since each module broadcasts relayed signals from the devices, if these signals were not identified as being from other modules, mistaken identification of device information and location could occur if a module misinterprets a signal from another module as a device signal. Accordingly, the relayed signal may be wrapped in a manner that clearly distinguishes it from a device signal.

Also, in this example, the process determines if the vehicle has been in motion more than a threshold amount of time 407. If the vehicle has been moving for some time, it is unlikely that the detected signal relates to a new occupant (i.e., a previously undetected occupant) since people do not typically enter moving vehicles. Similarly, the module determines if the doors have been closed more than a threshold period of time 409, as occupants do not typically enter through windows.

Although these checks 407 and 409 may help prevent redundancies, the process may also elect to forego either or both checks, because some devices may simply not be powered until some point into a journey. Whether these or other vetting steps are included is largely a matter of design choice. In this example, once it has been confirmed that the signal is not from another module, the vehicle has not been in motion for longer than the threshold time, and the doors have not been closed for longer than the associated threshold time, the signal is relayed to the central processor 411.

Figure 5A:
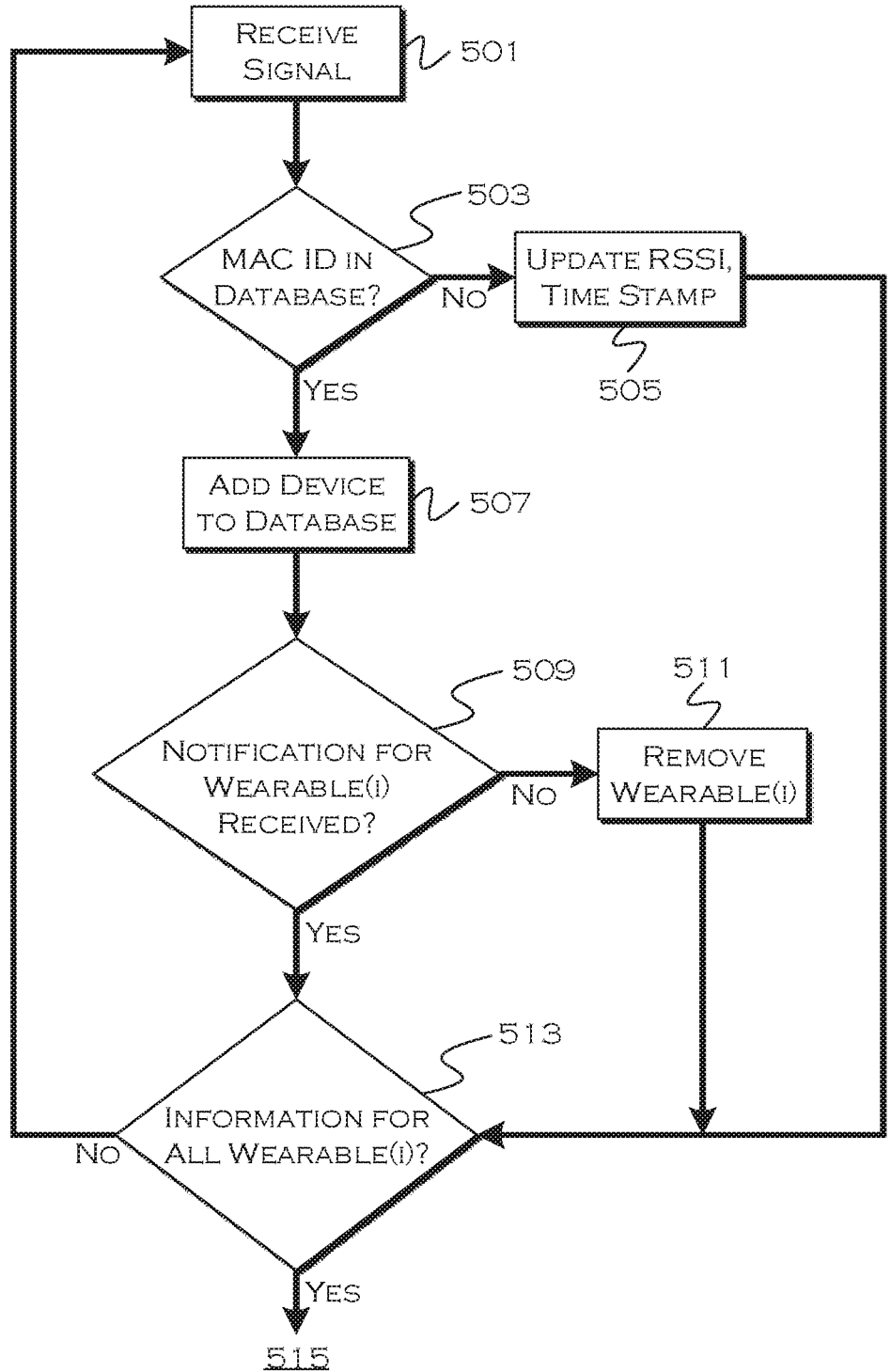
FIGS. 5A and 5B show an illustrative process for device locating and registration.
Figure 5B:
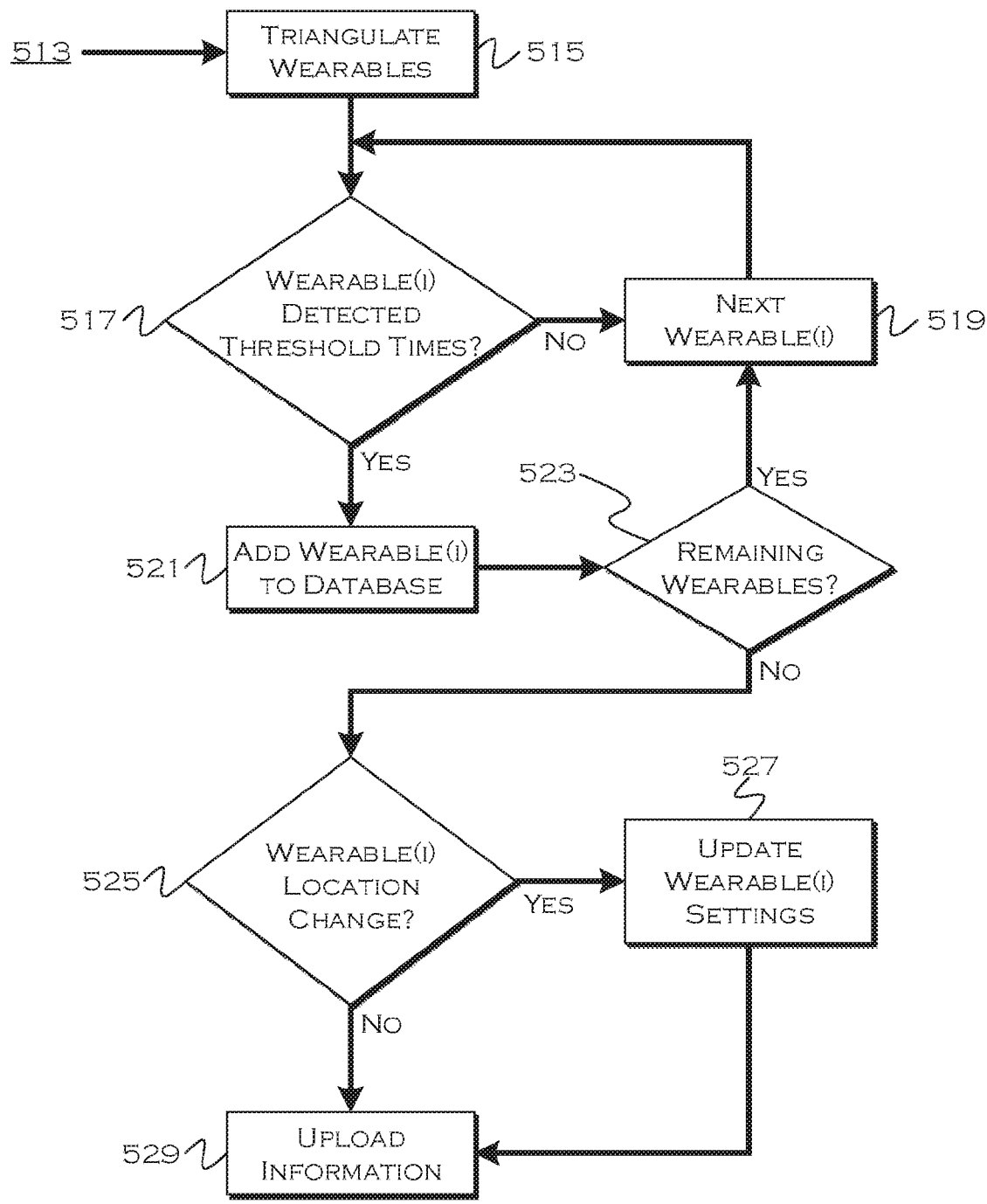

FIG. 5 shows an illustrative process for device locating and registration. In this illustrative example, the processor receives a signal from one of the modules 501. Each module receiving a signal from a particular device will report that signal to the central processor, so that RSSI in conjunction with device ID (such as MAC address) can be used to triangulate device location.

In this example, each received signal has a MAC address included therewith, which indentifies the device which originally identified itself to the relaying module. Other suitable unique identifiers may also be used.

Here, if the MAC address is in a database 503 (i.e., the signal has been seen at least once before), the process will update a record 505 associated with the MAC address (and device) within the database. This can include, for example, updating a timestamp associated with the received signal as well as an updated RSSI (in case the device has moved). Information about which module relayed the signal will also be included so the record in the database for each MAC address includes which devices recognized the wearable's signal and when.

If the MAC address is not stored, a new device record will be created in the database 507. This can be a temporary or permanent entry, although in this example the entry is initially a temporary one. Along with adding the device to the database, the reporting module, signal strength, timestamp and any other appropriate information are stored.

The process will also determine, for any wearable(i) already stored in the database, whether any information has been received within a threshold time period 509. For example, the process may run until the vehicle has been moving for two minutes, or until ten minutes from vehicle startup, or until the doors have been closed and the vehicle is moving, or any other reasonable threshold determination that all occupants "should" be in the vehicle by that point, and therefore signals from all present devices should be received, and the locations of the devices should be relatively fixed (with respect to seating).

If notification for a particular wearable has not yet been received, and a threshold time period has passed, the process may remove that wearable 511 from the database. In this example, the database may include permanent and temporary records. The permanent records may include users identified (by recognition or by occupant instruction) as frequent occupants. Profile information and other useful information (preferences, settings, etc) may be stored locally for these occupants. A counter for any identified devices may be stored so that a vehicle can count how often a particular device is observed to determine if the device should be registered in the permanent database portion.

The temporary database may hold information relating to all devices present in a vehicle for a particular journey. The record of a particular device may be removed from this system at a journey's end, or may persist until a journey where that device is not reported (and thus is removed on the basis of non-reporting). In this example, the process determines if information for all expected wearables(i) in the database has been received 513.

For example, if a database holds record of four devices, 221, 222, 223 and 225, and the passenger configuration shown in FIG. 2 is present, each device 221, 223 and 225 will report itself through the modules at some point. Since device 222 is not actually present (or shown), the device will not self-report.

Before the threshold time period or other journey-initiation indicia occurs, step 513 will report "no" because information for device 222 has not yet been received (because that particular device is not present in FIG. 2). Once the threshold has passed, the device 222 will be removed from the temporary database, and step 513 will report "yes" since at least some information has been received for all present devices that are also registered in the temporary database.

The process then triangulates the location of each of the wearables 515. While triangulation can be an ongoing process or determined whenever a new signal is received (assuming there is sufficient data to triangulate), in this example the triangulation is delayed until the journey has begun (the inception threshold or indicia). Each device and predicted possessor is assigned a location in the vehicle, and any related profile information may be accessed and utilized as may be appropriate for that person at that location. As an alternative to triangulation, or as an alternative description of triangulation, the device location may be determined by which relay module identifies the strongest received signal strength (RSSI), i.e. the device being designated or associated with a seating location based on an associated or designated relay module. This implementation may depend on the particular deployment locations of the relay transceivers since a transceiver equidistant between two seating locations may not be able to be used for identification of a proximate device without additional information In such cases, multiple signal strengths can be used to further refine a device location.

Also, if the device reports a possessor identity (determinable, for example, through biometrics), this information can be used to more accurately identify the possessor. If the possessor is unexpected (i.e., not the previously observed possessor), a profile for that possessor can be created and the device can be associated with multiple possessors. Additionally or alternatively, a device profile can be modified to reflect multiple possible possessors.

If a wearable is detected more than a threshold number of times 517 (which can be based on a counter associated with detecting the presence of a particular wearable for multiple journeys), the process can add that wearable(i) to the permanent database 521. This stores a record of that possessor and/or device as a frequent occupant/device, and local profile information can be stored, updated and/or created as appropriate. The frequent occupant identification process can be completed for each wearable 519 as long as any wearables(i) for which the process has not yet been completed remain 523.

Also, each wearable(i) in the frequently occurring permanent database may have a location or locations associated therewith. If a new location or an unexpected location is determined with respect to a particular wearable(i) 525, the process can update a record of where that person is sitting and where that person commonly sits 527. Finally, in this example, the information pertaining to the wearables, their locations and any associated profiles and/or settings or setting changes can all be uploaded to the cloud 529.

Through use of the plug-and-play modules, any vehicle can be retrofitted with an occupant detection and locator system. By simply wearing a wearable, individual occupant locations can be detected and tracked, and occupant setting changes and preferences can be stored to the cloud in a retrievable manner, allowing porting of settings from vehicle to vehicle. Although possessor identity is not guaranteed to be accurate, a much more likely-accurate identification of the particular occupants and their respective locations can be made.

One non-limiting example of a use of the device detection and location detection embodiments, and the like, described herein, is to automatically engage or disengage child-locks on vehicle doors. A typical child lock involves a switch or physical lock that will prevent a door from being opened from the inside whether or not the door is unlocked. The controls can also apply to the windows if desired, preventing any or some adjustment, or at least lowering, of the window, for example.

Further improvements can be made to the child-lock concept, such as, but not limited to, lock-out of: seat adjustment, climate control for the rear seat(s), rear seat massage or other electronic features, entertainment system control (limited or no control based on lock states), electronic interfaces, etc. Generally, the illustrative embodiments can provide control over any electronic system or manual system that has user interaction and is also designed to be selectively controlled. Embodiments may include a configurable set of options so a parent or driver can control what is adjusted and when, based on which child locks are engaged. Because the illustrative embodiments provide a method of identifying device location (and thereby owner location), specific configurations can be made on a device-by-device (or owner-by-owner) basis. Through the illustrative embodiment, lockable system state changes (lock/unlock) can be automatically applied in response to certain devices being detected or being detected in certain locations. Manual changes (through a human machine interface (HMI) input) can also be dynamically applied with respect to any given trip.

For example, if child A is nine and child B is four, a child A device located in the back seat may lockout the door control but not the entertainment control, and a child B device may lockout both. Or, for example, if the A device is on the left and the B device is on the right, both doors may be locked-out, left-hand entertainment, but not HVAC controls may be permitted, and everything on the right-hand from a control perspective may be locked. This is a non-limiting example of how user-specific lockout of systems can be applied at a granular level. A more generalized example includes simply locking-out door/window usage for children of certain ages or specified parties. In still another example, the child lock could be engaged only when a vehicle is moving, or only when a vehicle is moving for children of a certain age (i.e., the nine-year-old's door may unlock when the vehicle stops, the four year-old's door may remain locked while the corresponding device is detected proximate to that door, regardless of drive state).

Also, in this example, device profiles and/or user profiles can be established for devices, stored locally and uploaded to the cloud (or uploaded to the device). For example, if a lock schema is set for a certain device, the profile associated with the device (and/or owner) may be uploaded, and entering other vehicles with that device could cause similar settings to apply.

In another example, device settings may apply unless preconfigured vehicle settings for another vehicle dictate a more-secure state of settings. This prevents drivers of the other vehicle from having their personal preference settings overridden by the presence of a device with competing settings. Age-related controls could also be applied, so that a device owner of, for example, sixteen years, would have personalized settings overriding vehicle settings, but a device owner of, for example, four years, would have more restrictive settings applied (i.e., either device or vehicle settings override, based on which provides less control of vehicle features).

If driver age (or other characteristic) is not included in a profile, a default standard for a device could be used. This could include applying a generic standard for devices of a certain type or category, applying certain standards for devices typically associated with adults (e.g., a smartwatch) and other standards for devices typically associated with children (e.g., a child smartwatch, a child phone, etc.). Usage demographics can be employed to generally establish the age ranges for device usage (e.g., while not impossible, it is unlikely that a 3-year old has a personal cell phone).

Figure 6:
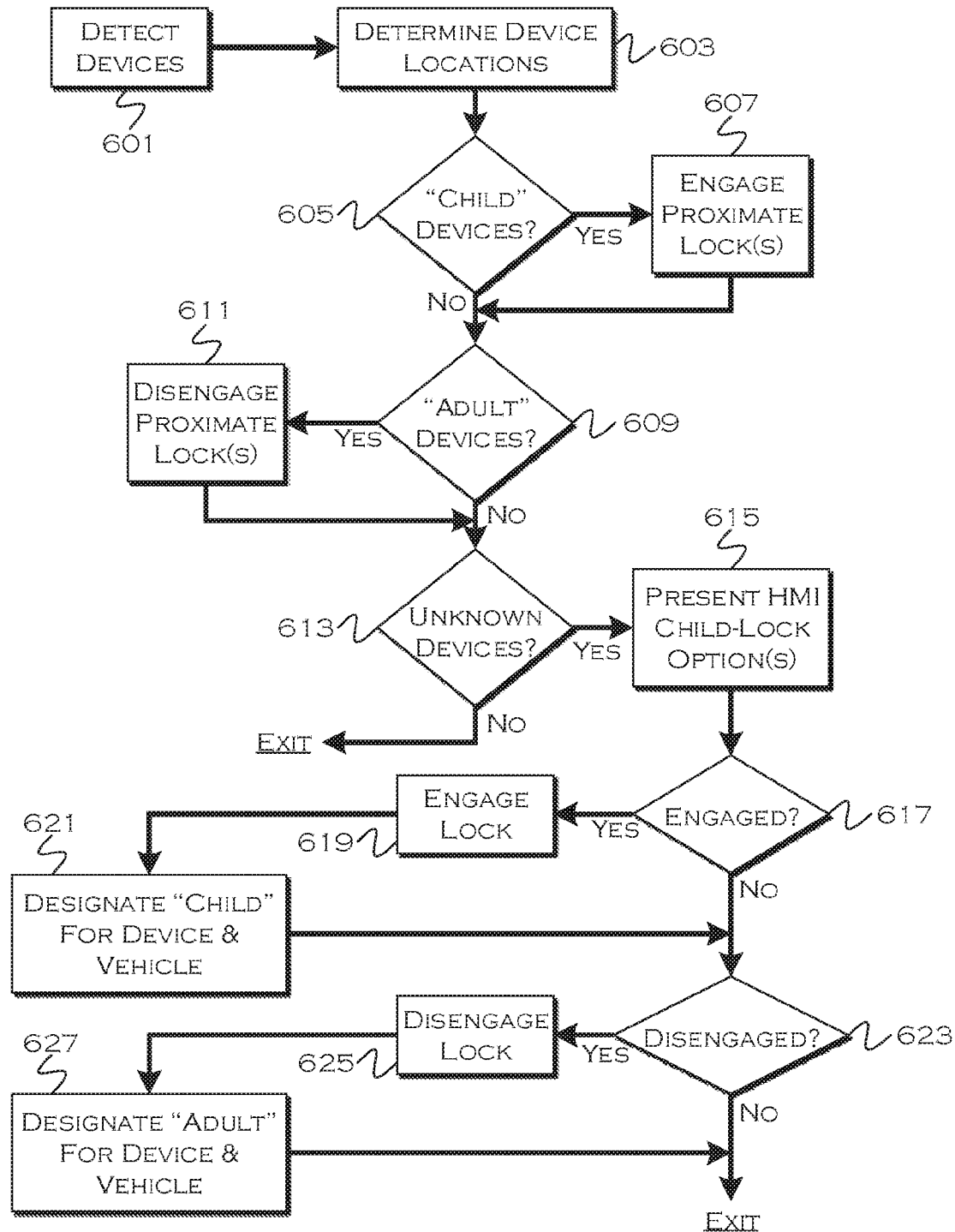
FIG. 6 shows an illustrative process for lock-state setting.

FIG. 6 shows an illustrative process for lock-state setting. In this illustrative example, the process identifies one or more devices present in the vehicle, in accordance with the illustrative embodiments previously presented. Thus, the system determines devices and associated locations for some or all of the devices, as well as which owners are likely located at the same location as those devices. Accordingly, for at least one identified device or location where lockable controls exist, the process may communicate with the device 601. This communication can include receipt of the device signal or receipt of a relayed device signal. As used in this description, communication does not necessarily mean that the process (running on a vehicle computer, for example) communicates directly with the device, although such communication is possible in some implementations.

For each device (or for a representative device for each location, if more than one device is present in a single seat location), the process will determine the location of the device within the vehicle 601. This can be done in accordance with the embodiments presented herein for determining device location, for example.

If any of the devices are identified as being associated with a child 605, the process will engage proximate door/control locks for the systems that correspond to the seat location of the device(s) 607. Devices may be identified as child devices in any number of manners. For example, without limitation, there may be a profile (locally or in the cloud) associated with a device or known device-holder, which corresponds to a child identity. Or the device itself may be classified as a child device (such as a shock/spill resistant electronic device designed for children). In the future, it is also possible that any number of children's toys will be equipped with Bluetooth or other wireless capability, and can be identified and located in the same manner as the phones/tablets/wearables described in the examples herein, and associated with a child. Child location-tracking devices are other examples of child devices that might be identified and located.

For each device, there may be a preset profile that defines which systems are locked for the associated possessor based on the presence of the device. If no such profile exists, a default locking schema may be utilized (such as, but not limited to, lock-everything).

Similarly, if any devices are identified as associated with an adult 609, the process may disengage any locks 611 proximate to those device locations. Just as the devices may be identified as adult or child devices, a known user profile for a common device-holder may also identify the owner/holder as an adult or child, so similar actions can be taken. That is, a common adult device may be specifically known to be owned/possessed by a child commonly, so the profile may dictate child actions instead of adult actions even though the device itself is an adult device. By disengaging locks for known adults, the process may prevent adult passengers from being locked-out of system control.

In this example, if there are one or more unknown devices 613 for which no profile is stored or no reasonable estimate as to owner age can be made, the process may present a human machine interface (HMI) in the vehicle or on a driver's or other known adult's device 615. The HMI can then be used to select locking options for each device whose location has been identified For example, if the driver selects "lock" (generically for all lockable systems or specifically with respect to some lockable systems) for a back-left seat, then the process may associate the known device holder with a state that should include locking the designated systems. If any locks are thus manually instructed to be engaged 617, the process will engage the designated locks 619 and may further (if desired) designate this device and/or user (if the user is distinguishably identifiable from the device) as a child. Additionally or alternatively, the locking schema for that user (in that location or in general) can be saved with respect to that device profile and/or user profile 621.

For some devices, it may be possible to distinctively identify different possessors (for example, biometrics can be used to distinguish between multiple possessors) and for other devices, a device profile may simply be established that is assumed to correspond to a common user. It is also possible to develop profiles to the granular level of, for example, certain user with certain device in certain location. On the other hand, a locking schema that is user-agnostic can generically be applied to a device for use in any reasonable location.

If any systems are manually disengaged (if previously employed locks are now manually instructed to be unlocked through the HMI) for a particular device or user 623, the process will disengage the instructed locks 625 (or all locks) and register the device as being associated with an adult (or otherwise save the locking schema) 627.

By preserving the schema on a device-by-device, user-by-user, vehicle-by-vehicle or in a combinatorial manner of the preceding, specific or generic locking schema can be developed for particular vehicles or in general. Since this information can be uploaded to profiles stored in the cloud, the data can be obtained to apply various settings. For example, settings may be applied for a rental vehicle helping ensure that a parent does not forget to engage child locks, or need to consult the vehicle manual to determine what features the vehicle may include and how to engage particular features.

Figure 7:
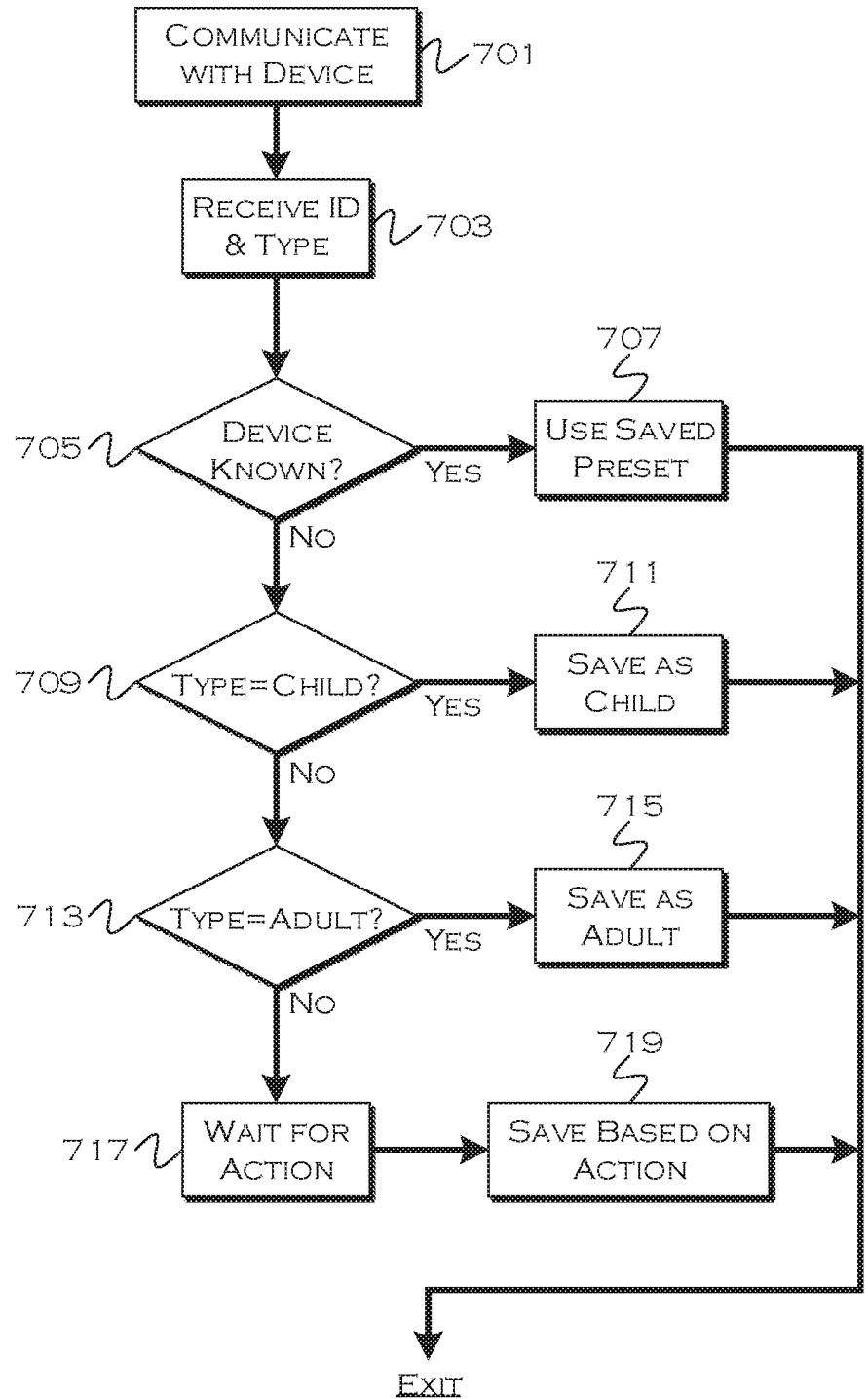
FIG. 7 shows an illustrative process for device profiling.

FIG. 7 shows an illustrative process for device profiling. Again, some form of communication (direct, relay of ID, etc) is used between the process and the individual device(s) 701. In this example, for each device for which a determination is to be made, a device ID and possibly a device type are received 703 (through direct query, or, for example, relay of a device signal as discussed herein). Device types, if utilized, can help identify the device and associated settings based on a particular user classification, such as a child or adult, for example. Device types may also include such device classifications such as a wearable, tablet, phone, etc. It is also possible that user type and/or device type information is obtained after receiving a device ID included in a relayed signal. For example, the received device ID may include a device make and/or model of the device that may be used to access a lookup table containing device type information.

If a user profile or device profile has been previously created for a particular device/device ID such that the device is known 705, the process will access a previously saved locking schema 707. Depending on the granularity of the schema, this could be a general schema (for all vehicles), a location-within-vehicle schema (for all vehicles, based on device location within the vehicle), a user-specific schema (if the user/possessor is identified), a vehicle-specific schema, etc. Of course various other implementations that differ from the specific illustrative examples can also be employed.

If the device is not known, but the device type is known as a child device 709, the process will save a profile for the device as a child device 711 and take any action predesignated for child devices. This could include a predefined set of actions, a driver defined set of actions, or a set of actions defined in response to prompting. Specific actions (locking schema) can also be defined for a particular device. In other examples, the identification of a device type and/or the specific actions to be taken for a particular device type or a specific device can be imported from a cloud profile for the device/user.

If the device itself is not known, but the device type is identified as associated with an adult 713, the process will save the profile for the device as an adult device. Similar to the child device above, generic or specific unlocking/locking can be employed, which can include defining this action for the device in other vehicles and/or defining this action with respect to a single vehicle.

It is also possible for devices to have child-parent relationships established, whereby only the presence of a parent device can define a persistent, or at least cloud-persistent, locking schema for a child device. This prevents other parents (in a car pool, for example) from redefining occupant device locking schema, except perhaps with respect to their specific vehicles. In a similar manner, adult devices may only be persistently definable on a vehicle-by-vehicle basis, unless authorized by the holder of the device.

If the device is unknown and unidentifiable as an adult or child device, the process may simply wait for a definition of locking schema (lock/unlock proximate systems) 717 to be entered for that device. Once defined, the profile can be saved locally for that device 719 and/or uploaded to the cloud if appropriate. Local storage of device-specific schema avoids the driver having to redefine the schema upon each journey with common occupants. Schema export (to the cloud) and import (from the cloud) allows faster compliance with desired settings as well, especially when traveling or in a family owning multiple vehicles.

Since all vehicles do not have the same settings, undefined settings may be locked or unlocked as appropriate, based on various designations (e.g., without limitation, an adult designation results in unlock of all undefined settings, a child designation results in lock of all undefined settings). Undesired locking or unlocking settings can be easily changed by a driver or other designated controller through the vehicle HMI, for example. A message can also be generated and presented if certain default settings are applied, so the driver/controller knows which possibly unexpected settings were applied.

Figure 8:
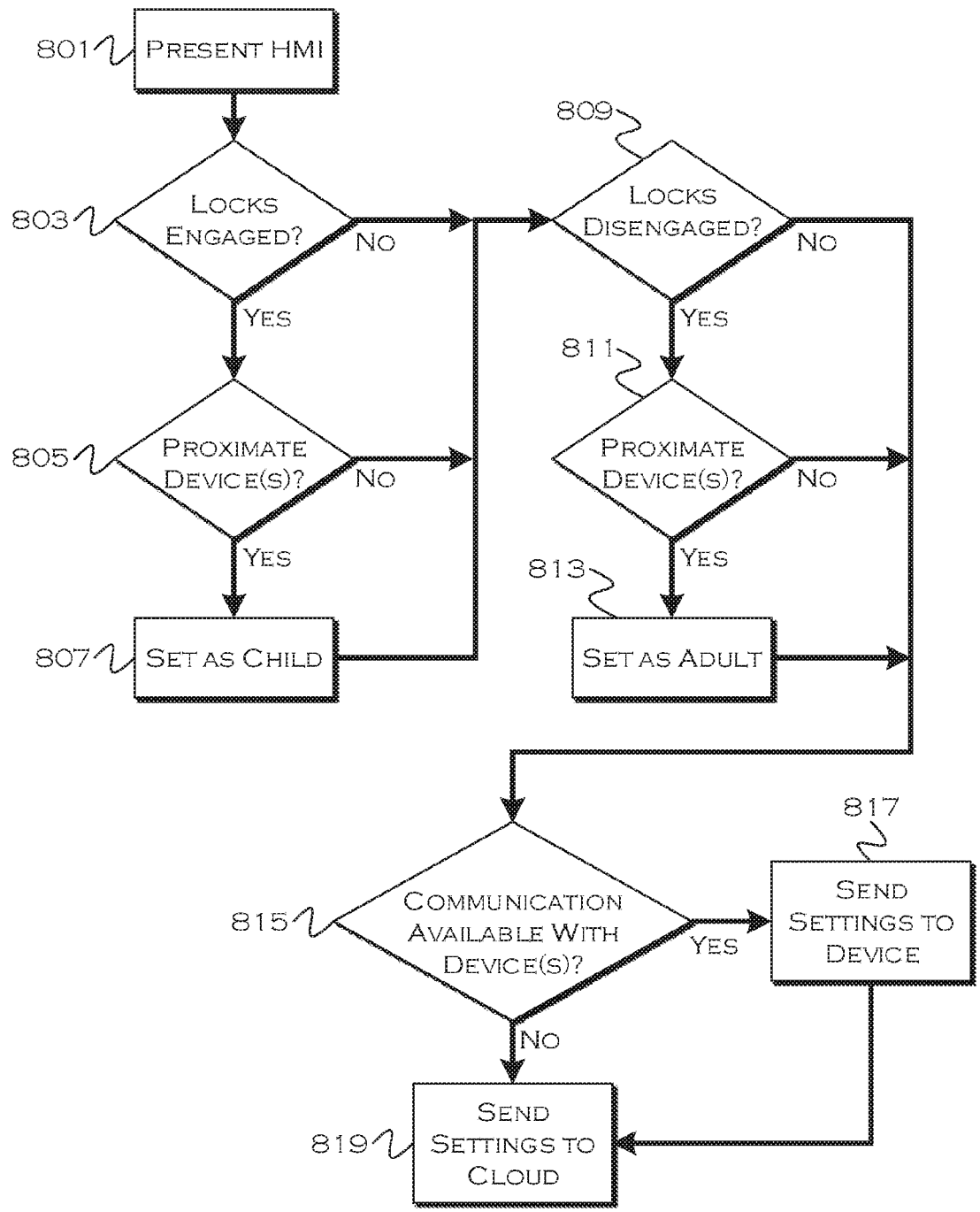
FIG. 8 shows an illustrative process for locking schema setting and upload.

FIG. 8 shows an illustrative process for locking schema setting and upload. In this illustrative example, an HMI is presented 801. This can be presented on a vehicle display which corresponds to a driver (such as center stack display) or front-passenger location. Alternatively, if a known adult or parent is identified as being located proximate to a rear HMI, the display could be presented at that location. The person interacting with the display (also referred to as the controller) may\change or define the settings for each identified device, or each device which does not have pre-designated settings, or another suitable control schema.

For example, the display may show a wireframe or image of the vehicle displaying devices/locations/owners present and status for any or all lockable systems. The controller or driver can then designate engagement or disengagement of lockable systems based on interaction with the display. A similar display can additionally or alternatively be presented on a driver or controller device display if the device is in communication with the vehicle.

If changes are implemented (i.e., if any locks are instructed to be engaged or disengaged), the process determines which locks were engaged 803. For systems which are manually locked via the HMI, the process determines if any devices are known to be proximate 805. These devices may then be designated as child devices 807 and the now-defined locking schema can be associated therewith, either locally and/or with respect to a profile that persists in the cloud.

In a similar manner, if any locks are manually instructed to be disengaged through the HMI 809, and if any devices are proximate to the disengaged locks 811, those devices can be designated as adult devices 813 and the locking schema can be persistently associated therewith, either locally and/or in the cloud. It is also possible that a parent engaged all locks initially for a particular device, and later disengages some level of locks, but not all locks. It may be inappropriate to designate such a device as an adult device on the basis of limited disengagement with appropriate checks and balances included as needed. For example, the designation of adult in some instances may not occur unless all locks are disengaged for a particular device.

In this example, if communication is available with one or more devices 815, the locking settings are also sent to the particular devices to which the changes or designations applied. This allows the device to self-identify a locking schema, which may be especially useful for child-devices that enter vehicles lacking cloud access, but which can still utilize the locking schema. For certain devices (or all devices if desired), the holder can also confirm saving of the settings and/or confirm an upload of the settings. If a parent-child relationship is established between a parent device/vehicle and a child device, the settings may be automatically saved and/or uploaded. As appropriate, the locking schema changes/designations are also uploaded to the cloud 817.

Through the use of the portable locking schemas as described herein, locking schema for various child-lockable systems can be established for a variety of situations. Based on differing levels of granularity, these can be generic to a device, or defined as specifically as, for example, a user in a certain vehicle in a certain location. An implementer can decide what level of definition is appropriate for a given situation.

While representative embodiments are described above, it is not intended that these embodiments describe all possible forms of the invention. The words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine a location of a wirelessly-identified device within a vehicle;
obtain a locking schema associated with the device and defining locking states for child-lockable vehicle systems; and
determine which of the child-lockable vehicle systems are within a predefined proximity to the device location; and
set the locking states, based on the locking schema, of child-lockable vehicle systems in the predefined proximity to the device location.

2. The system of claim 1, wherein the child-lockable systems include child locks on vehicle doors.

3. The system of claim 1, wherein the child-lockable systems include climate controls.

4. The system of claim 1, wherein the child-lockable systems include entertainment controls.

5. The system of claim 1, wherein the processor is configured to obtain the locking schema from a vehicle-stored device profile.

6. The system of claim 1, wherein the processor is configured to obtain the locking schema from a remotely stored device profile obtained wirelessly by the processor.

7. The system of claim 1, wherein the child-lockable systems include vehicle human machine interfaces.

8. The system of claim 1, wherein the processor is configured to:
present a human machine interface (HMI) including selectable control over child-lockable systems;
receive input to the HMI instructing a state change of a child-lockable system within the predefined proximity to the device; and
adjust the locking schema associated with the device based on the received input.

9. The system of claim 1, wherein the child-lockable systems include seat adjustment controls.

10. The system of claim 1, wherein the processor is configured to:
categorize a device for which a known profile does not exist as a child device, and
obtain a predefined child device locking schema stored in the vehicle as the locking schema associated with the device.

11. The system of claim 10, wherein the processor is configured to categorize the device as a child device based on the device wirelessly self-identifying as a child device.

12. The system of claim 10, wherein the processor is configured to categorize the device as a child device based on a lookup of predefined device categories utilizing a device identification wirelessly obtained from the device.

13. The system of claim 1, wherein the processor is configured to:
   categorize a device for which a known profile does not exist as an adult device, and
   obtain a predefined adult device locking schema stored in the vehicle as the locking schema associated with the device.

14. The system of claim 13, wherein the processor is configured to categorize the device as an adult device based on the device wirelessly self-identifying as an adult device.

15. The system of claim 13, wherein the processor is configured to categorize the device as an adult device based on a lookup of predefined device categories utilizing a device identification wirelessly obtained from the device.

16. The system of claim 1, wherein the processor is configured to:
   wirelessly upload a device profile, including state settings for child-lockable vehicle systems associated with the device, to a remote system.

17. A computer-implemented method comprising:
   obtaining a locking schema associated with an identified wireless device, the schema defining locking state settings for child-lockable vehicle systems;
   setting states of the child-lockable vehicle systems, based on the locking state settings, and wherein the systems are determined to be within a predefined proximity to a determined device location within a vehicle.

18. The method of claim 17, wherein the predefined state settings are obtained from at least one of: the device, through wireless communication with the device, a locally stored device profile or a remotely stored device profile.

19. A computer-implemented method comprising:
   obtaining a locking schema defining child-lockable system locking state settings, the schema associated with a wireless device within a vehicle at a determined location within the vehicle; and
   applying the locking schema to child-lockable systems within the vehicle in a predefined proximity to the determined location, such that the child-lockable systems are set to the locking states defined by the locking schema when the child-lockable systems are within the predefined proximity to the device location.

20. The method of claim 19, wherein the method includes retrieving the locking schema from at least one of: the device, through wireless communication with the device, a locally stored device profile or a remotely stored device profile.

* * * * *